(12) United States Patent
Dangi et al.

(10) Patent No.: US 12,189,494 B2
(45) Date of Patent: Jan. 7, 2025

(54) ROLLBACK FROM A RETENTION LOCKED NAMESPACE

(71) Applicant: Dell Products L.P., Round Rock, TX (US)

(72) Inventors: Salil Dangi, Mission Viejo, CA (US); Nitin Madan, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 18/162,381

(22) Filed: Jan. 31, 2023

(65) Prior Publication Data

US 2024/0256393 A1   Aug. 1, 2024

(51) Int. Cl.
  *G06F 11/14*   (2006.01)
  *G06F 16/11*   (2019.01)
  *G06F 16/176*  (2019.01)

(52) U.S. Cl.
  CPC ........ *G06F 11/1464* (2013.01); *G06F 16/125* (2019.01); *G06F 16/1774* (2019.01); *G06F 2201/84* (2013.01)

(58) Field of Classification Search
  CPC ............... G06F 11/1464; G06F 16/125; G06F 16/1774; G06F 2201/84
  USPC ........................................................ 707/649
  See application file for complete search history.

(56) References Cited

U.S. PATENT DOCUMENTS

| | | | | |
|---|---|---|---|---|
| 11,550,666 | B1* | 1/2023 | Gunda | G06F 11/1453 |
| 2018/0137139 | A1* | 5/2018 | Bangalore | G06F 16/2379 |
| 2020/0250043 | A1* | 8/2020 | Prabhakar | G06F 16/1734 |
| 2020/0250149 | A1* | 8/2020 | Bono | G06F 16/122 |
| 2020/0341855 | A1* | 10/2020 | Tanwer | G06F 11/1464 |
| 2021/0200641 | A1* | 7/2021 | Bafna | G06F 16/1734 |
| 2021/0271561 | A1* | 9/2021 | Mathew | G06F 9/30047 |
| 2022/0374519 | A1* | 11/2022 | Botelho | G06F 9/45558 |

* cited by examiner

*Primary Examiner* — Hosain T Alam
*Assistant Examiner* — Nicholas E Allen
(74) *Attorney, Agent, or Firm* — Workman Nydegger

(57) ABSTRACT

One example method includes accessing a point-in-time copy including retention locked backups that were stored on a backup storage server at a time the point-in-time copy was generated. The method further includes accessing a current namespace including retention locked backups that are currently stored on the backup storage server. Each retention locked backup includes data backup files. The method also includes determining a first set of retention locked backups that are included in the point-in-time copy, but are not included in the current namespace. The method finally includes copying the first set of retention locked backups from the point-in-time copy into the current namespace without removing any of the retention locked backups already in the current namespace.

16 Claims, 15 Drawing Sheets

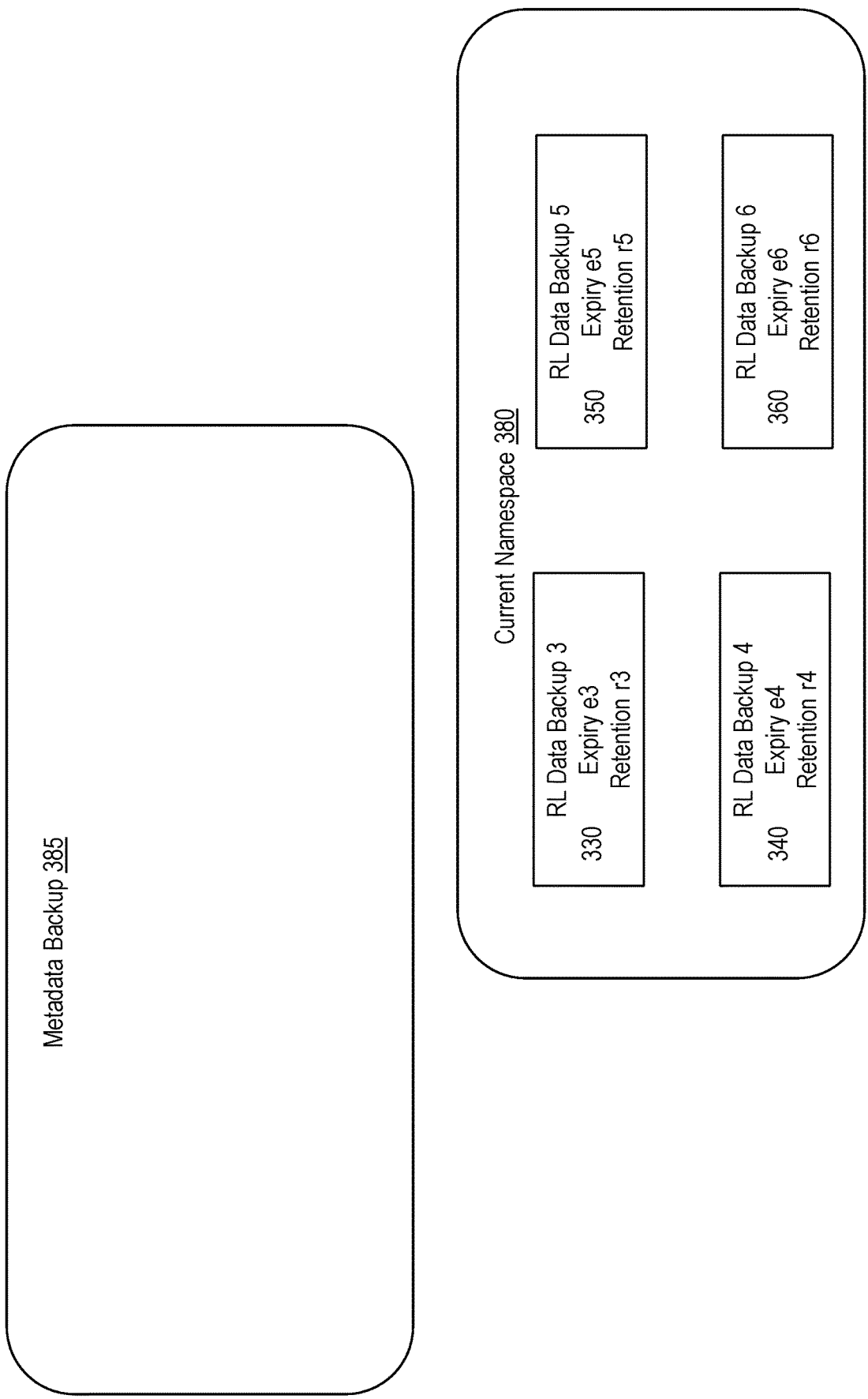

ROLLBACK FROM A RETENTION LOCKED NAMESPACE

FIELD OF THE INVENTION

Embodiments of the present invention generally relate to data backup and restore processes. More particularly, at least some embodiments of the invention relate to systems, hardware, software, computer-readable media, and methods for performing a rollback recovery process when stored backups are in retention lock mode.

BACKGROUND

Backup and restore systems typically include various elements such as a metadata backup server, a client backup server, and a backup storage server. All three of these elements work together to backup data and then to restore the data when there has been an event that requires the backed up data to be restored.

In recent years, users of the backup and restore systems have required that one or more of the metadata backup server, the client backup server, and the backup storage server provide enhanced retention measures to ensure that any backed up data is sufficiently secured so that it may not be lost, either through a malicious action or through user error. As these enhanced retention measures have been introduced, it has created problems for ensuring that the backup server, the client backup server, and the storage server are still able to operate together as one or more of these elements may not be easily configured to implement the enhanced retention measures.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIGS. 3A-3D illustrate an embodiment of a rollback recovery process when a backup storage server is in a retention lock mode;

DETAILED DESCRIPTION OF SOME EXAMPLE EMBODIMENTS

Figure 1:
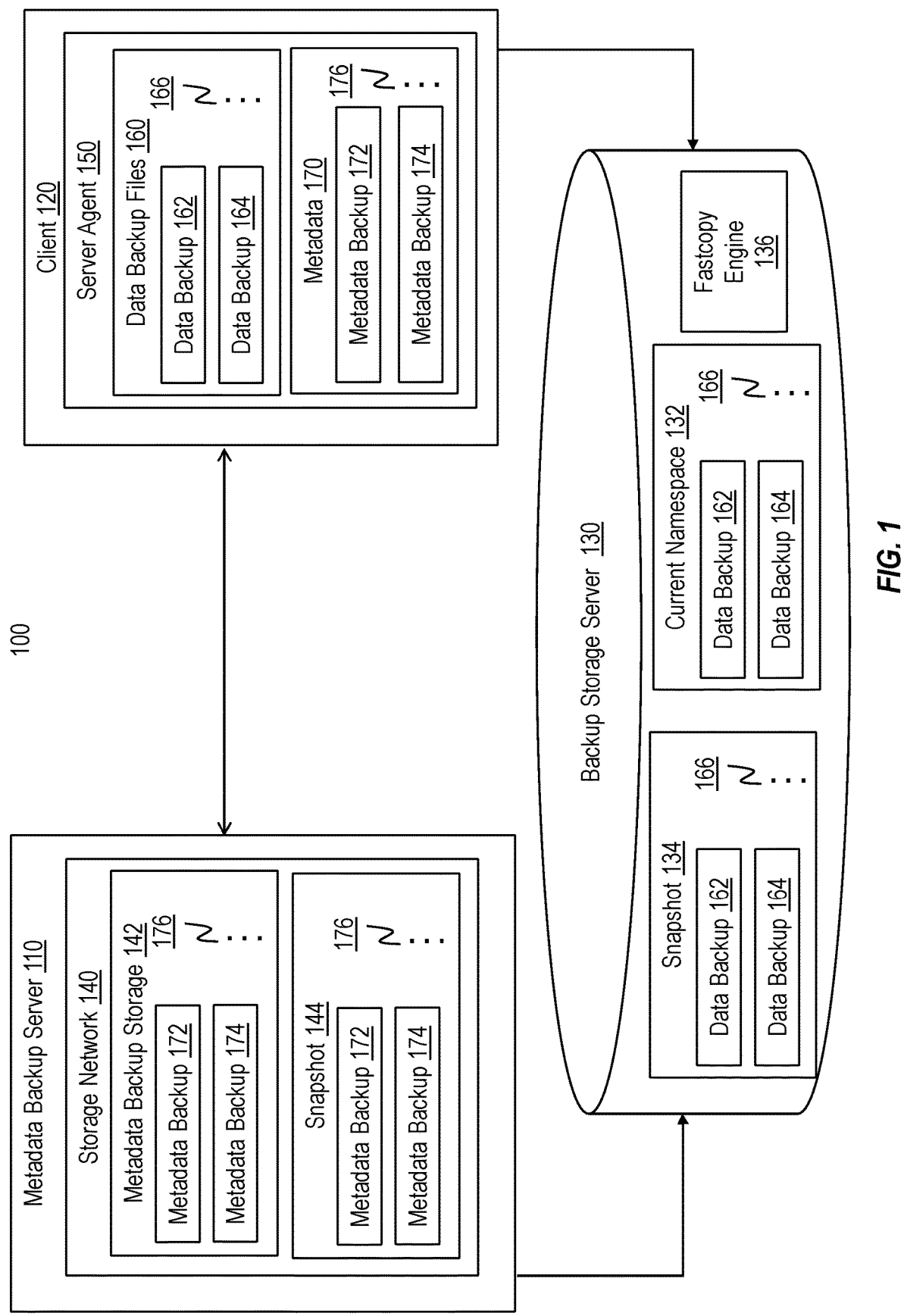
FIG. 1 illustrates an embodiment of a backup system.

Embodiments of the present invention generally relate to data backup and restore processes. More particularly, at least some embodiments of the invention relate to systems, hardware, software, computer-readable media, and methods for performing a rollback recovery process when stored backups are in retention lock mode.

One example method includes accessing a point-in-time copy including retention locked backups that were stored on a backup storage server at a time the point-in-time copy was generated. The method further includes accessing a current namespace including retention locked backups that are currently stored on the backup storage server. Each retention locked backup includes data backup files. The method also includes determining a first set of retention locked backups that are included in the point-in-time copy, but are not included in the current namespace. The method finally includes copying the first set of retention locked backups from the point-in-time copy into the current namespace without removing any of the retention locked backups already in the current namespace.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC PowerProtect DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, an embodiment of a backup and recovery computing system for performing data recovery and the like is denoted generally at 100. The backup and recovery computing system 100 includes a metadata backup server 110, a client 120, and a backup storage server 130. The metadata backup server 110 may be implemented as a single computing system or it may be distributed across multiple computing systems, which may be physical computing systems and/or virtual computing systems. The metadata backup server 110 is configured to provide backup storage and backup management capabilities. Accordingly, the metadata backup server 110 includes a storage network 140 for storing backup data such as metadata backup files and other data backup files. The storage network 140 may include a deduplication ("dedupe") engine that dedupes the data before it is stored on the storage network 140. In addition, the metadata backup server 110 may include a management module (not illustrated) that provides management services for the backup and recovery computing system 100 and also includes an interface for receiving user input. A backup storage management module (not illustrated) may provide management services to the backup storage server 130 and allow the metadata backup server 110 to communicate with the backup storage server 130. The metadata backup server 110 may include further components that are not illustrated in FIG. 1. In one embodiment, the metadata backup server 110 may be the Dell-EMC Avamar platform.

The client 120 may be implemented as a backup server that prepares data and its associated metadata that needs to be backed up and then writes the backup data and the metadata to the metadata backup server 110 and/or backup storage server 130. The client 120 may host a server agent 150, which may be an agent of the metadata backup server 110. The server agent 150 may be implemented as a plugin that is invoked by the client 120 as needed for performing data backups. The client 120 may also host a dedupe engine (not illustrated), which may be an API associated with the backup storage server 130. The dedupe engine may dedupe the backup data. Since the dedupe engine is an API associated with the backup storage server 130, it may also be used by the server agent 150 to write the deduped backup data to the backup storage server 130 and to otherwise interact with the backup storage server 130.

The backup storage server 130 is the target storage for the backup data from the client 120 and thus includes the physical storage where the backup data is stored. The backup storage server 130 may include its own dedupe engine (not illustrated) that can dedupe backup data as needed before the data is stored. The backup storage server 130 may also provide additional storage services as needed. In one embodiment, the backup storage server 130 may be the Dell-EMC PowerProtect DataDomain storage environment.

The metadata backup server 110 may request that the client 120 perform a backup of at least some of the data stored on the client. In response, the client 120 may invoke the server agent 150 for use in performing the data backup.

The server agent 150 prepares data backup files 160 that will be backed up onto the backup storage server 130. The server agent 150 also prepares metadata 170 that is associated with all the data backup files 160 and includes information about all the data backup files 160 such as file name, directory information, and other attribute information for each backup data file of the data backup files 160.

As shown in FIG. 1, the server agent writes the data backup files 160 to the backup storage server 130 as a data backup 162. The data backup 162 will typically remain stored on the backup storage server 130 until a predetermined expiry time has passed, at which time the data backup 162 will be removed from the backup storage server 130. In this way, the data backup 162 is available to be restored if needed. As shown in FIG. 1, the backup storage server 130 includes what is referred to as a "current namespace" 132. The current namespace 132 can conceptually be considered a current state of the backups on the backup storage server 130 that are active and useable by a user to perform a backup operation. Thus, the data backup 162 is shown as being part of the current namespace 132.

The server agent 150 also sends the metadata 170 to the metadata backup server 110 as a metadata backup 172, where the metadata backup 172 is stored in a metadata backup storage 142 of the storage network 140. The metadata backup 172 will typically remain stored on the metadata backup storage 142 until a predetermined expiry time has passed, at which time the metadata backup 172 will be removed from the metadata backup storage 142. In this way, metadata backup 172 is available to help restore the data backup files 160 as needed.

The backup process described above is repeated a number of times whenever the data stored on the client 120 needs to be backed up. Thus, the server agent 150 will prepare the data backup files 160 and the metadata 170 every time there is a backup procedure and will write the data backup files 160 as additional data backups to the backup storage server 130 and provide the metadata 170 as additional metadata backups to the storage network for storage on the metadata backup storage 142. In addition, there may be a large number of additional client computing systems that are generating data backup files and associated metadata that are stored on the backup storage server 130 and the metadata backup storage 142.

Accordingly, FIG. 1 shows a data backup 164 and ellipses 166 that illustrate that there may be any number of data backups in addition to the data backup 162 stored on the backup storage server 130. The data backup 164 and the additional data backups 166 are shown as being part of the current namespace 132. Likewise, Figure shows a metadata backup 174 and ellipses 176 that illustrate that there may be any number of additional metadata backups stored in the metadata backup storage 142.

The number of metadata backups stored in the metadata backup storage 142 may include tens of millions of metadata backups. Accordingly, the metadata backup server 110 generates periodic point-in-time copies of the metadata backups 172, 174, and 176 that are stored in the metadata backup storage 142 at a given time. In some embodiments, the point-in-time copy is called a snapshot or a checkpoint and is used in a data restoration or rollback process. Accordingly, as shown in FIG. 1, the metadata backup server 110 generates a snapshot 144 that includes the metadata backups 172, 174, and 176. It will be noted that the snapshot 144 only shows two metadata backups and the ellipses 176 for ease of illustration as in operation the snapshot will typically include tens of millions of metadata backups.

Likewise, the number of data backups stored on the backup storage server 130 may also include tens of millions of data backups. Accordingly, the backup storage server 130 also generates periodic point-in-time copies of the backup data files backups that are stored on the backup storage server 130 at a given time. In some embodiments, the point-in-time copy is also called a snapshot or a checkpoint and is used in a data restoration or rollback recovery process. Accordingly, as shown in FIG. 1, the backup storage server 130 has generated a snapshot 134 that includes the data backups 162, 164, and 166. It will be noted that the snapshot 134 only shows two data backups and the ellipses 166 for ease of illustration as in operation the snapshot will typically include tens of millions of data backups. In the embodiment, the snapshot 134 corresponds to the snapshot 144 as the two snapshots are generated at the same time and the metadata backups of the snapshot 144 include metadata for the data backups of the snapshot 134.

A. Aspects of Performing a Backup and Rollback Recovery Process

Figure 2A:
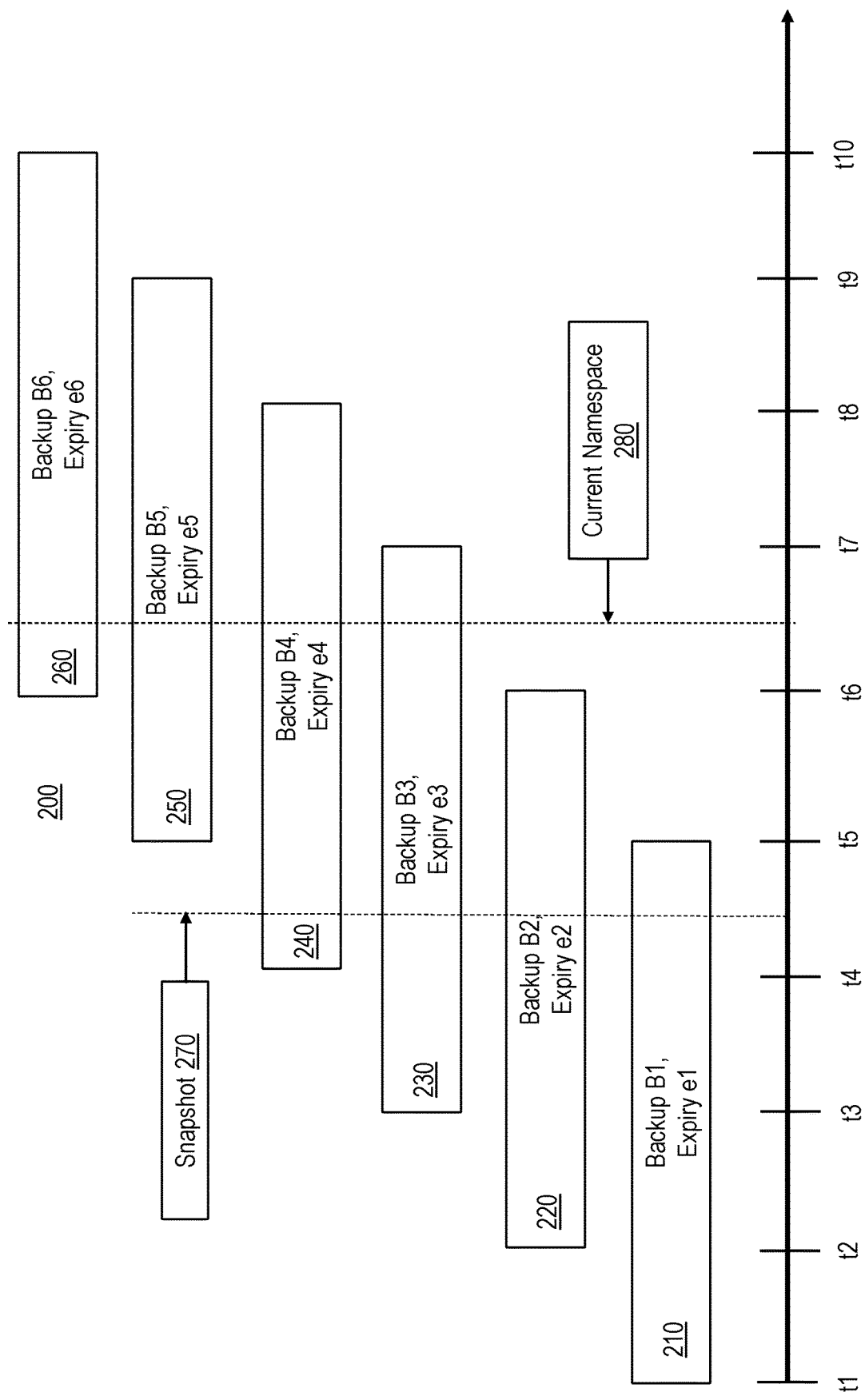
FIGS. 2A-2E illustrate an embodiment of a rollback recovery process.

FIG. 2A illustrates an embodiment of a timeline of a rollback recovery process 200 that may be performed by the backup and recovery computing system 100. The timeline also shows a backup B1 210 with an expiry time e1, a backup B2 220 with an expiry time e2, a backup B3 230 with an expiry time e3, a backup B4 240 with an expiry time e4, a backup B5 250 with an expiry time e5, and a backup B6 260 with an expiry time e6. For ease of illustration, the backups B1-B6 in FIG. 2A refer to both the data backups 162, 164, and 166 in the current namespace 132 and the metadata backups 172, 174, and 176 stored in the metadata backup storage 142. That is, to avoid having to duplicate the different backups in the figure, only a single backup is shown. In the discussion following FIG. 2A, the data backups and the metadata backups are shown separately.

As illustrated, the timeline of FIG. 2A shows time periods t1-t10 that are evenly spaced for ease of explanation. To illustrate this example embodiment, for ease of explanation, it is assumed that e1<e2<e3<e4<e5<e6. Please note, however, that the expiration times of the various backups do not need to be in this order. That is, although a lower number backup would be created before a higher number backup, the lower number backup need not expire first as it can have a longer expiry period. Thus, backup B1 210 would have to be created before backup B2 220, but it would not have to expire before backup B2 220 expires.

As shown in the timeline of FIG. 2A, the backup B1 210 is created at time t1 and is expected to expire at time t5. The backup B2 220 is created at time t2 and is expected to expire at time t6. The backup B3 230 is created at time t3 and is expected to expire at time t7. The backup B4 240 is created at time t4 and is expected to expire at time t8. The backup B5 250 is created at time t5 and is expected to expire at time t9. The backup B6 260 is created at time t6 and is expected to expire at time t10.

The metadata backup server 110 and the backup storage server 130 both generate a snapshot 270 at some time between t4 and t5. As shown in FIG. 2A, at the time when the snapshot 270 is generated only the backups B1-B4 are active as they have been created and stored in the current namespace 132 and the metadata backup storage 142.

Figure 2B:
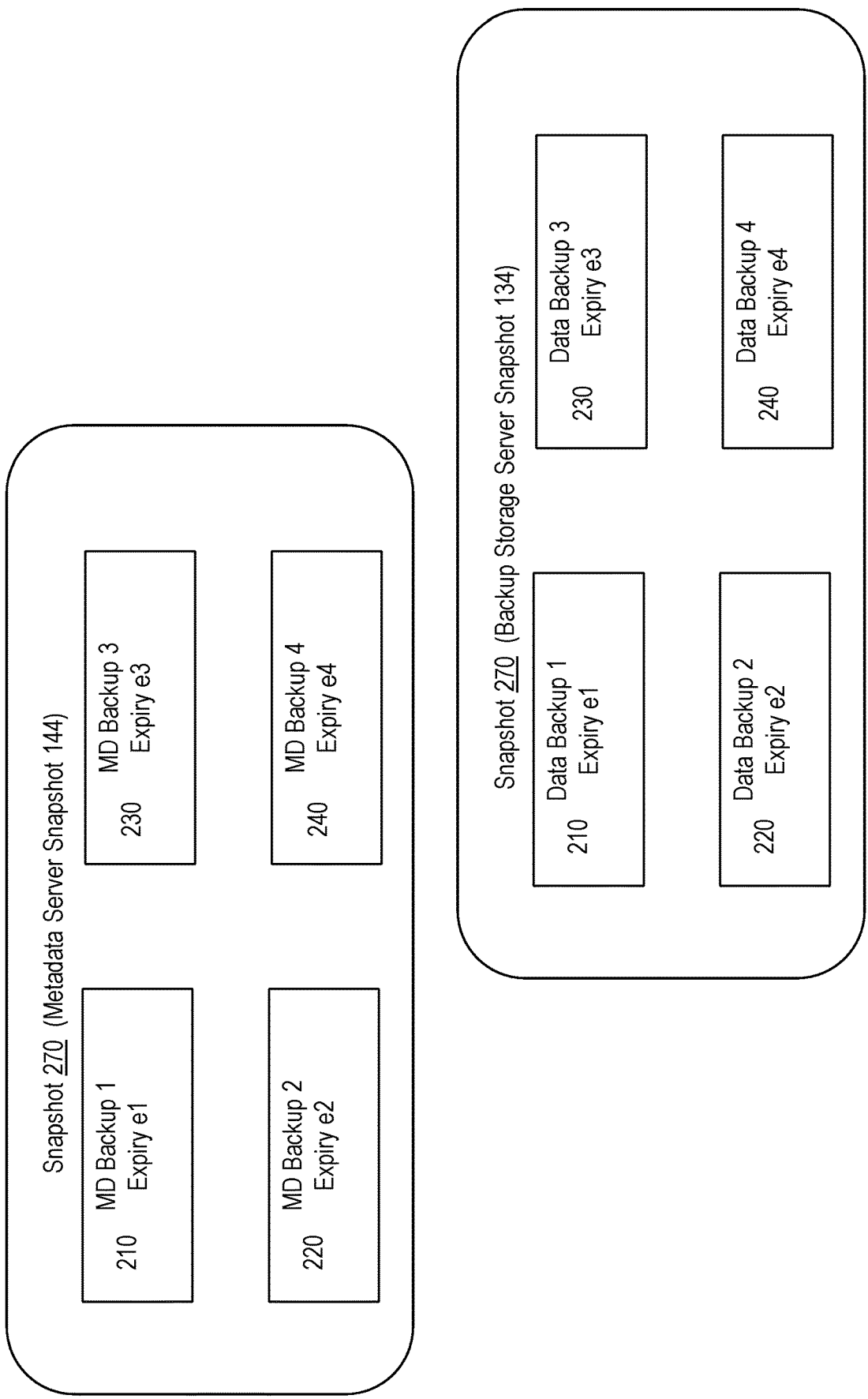

FIG. 2B illustrates the snapshot 270 generated by the metadata backup server 110 and the snapshot 270 generated the backup storage server 130. As shown in the figure, the snapshot 270 generated by the metadata backup server 110 includes MD backup B1 210, MD backup B2 220, MD backup B3 230, and MD backup B4 240, which may correspond to the metadata backups 172, 174, and 176, where "MD" is used to signify that these are metadata backups. The snapshot 270 generated by the backup storage server 130 includes data backup B1 210, data backup B2 220, data backup B3 230, and data backup B4 240, which may correspond to the data backups 162, 164, and 166, where "data" is used to signify that these are data backups. It will be appreciated that when the snapshot 270 is generated by the metadata backup server 110, the snapshot 270 is also generated by the backup storage server 130. Thus, the two snapshots work in tandem in the backup and recovery processes.

Referring again to the timeline of FIG. 2A, at time t5 the expiry time e1 has expired and at time t6 the expiry time e2 has expired. Accordingly, backup B1 210 is removed from the current namespace 132 and from the metadata backup storage 142 at time t5 and the backup B2 220 is removed from the current namespace 132 and from the metadata backup storage 142 at time t6. Thus, at a time between times t6 and t7, a current namespace 280, corresponding to the current namespace 132, includes data backup B3 230, data backup B4 240, data backup B5 250, and data backup B6 260 and a metadata backup storage 285, corresponding to the metadata backup storage 142, includes MD backup B3 230, MD backup B4 240, MD backup B5 250, and MD backup B6 260 as shown in FIG. 2C.

Suppose at the time between t6 and t7, the metadata becomes corrupted in some way so that the metadata backup server 110 is no longer able to access and use the metadata backups stored in the metadata backup storage 285. That is, something went wrong with the metadata of one or more of the backups B3-B6 stored in the metadata backup storage 285 at the time between t6 and t7, leading the metadata backup server 110 to be in an invalid state. Alternatively, suppose that at the time between t6 and t7, an administrator determines that there is a backup that is included in the snapshot 270, but that is not included in the current namespace 280, that is now needed. For example, the data backup 2 220 may have expired and so has been removed from the current namespace 280, thus making it no longer available from the current namespace 280 and only available from the snapshot 270. In the case of the metadata corruption, a rollback recovery process will be performed that restores to the metadata backup server 110 the last known good copy of the metadata. In the case of the needing to recover the data backup B2 220 from the snapshot 270, the rollback recovery process will restore the data backup B2 220 to the current namespace 280.

Figure 2C:
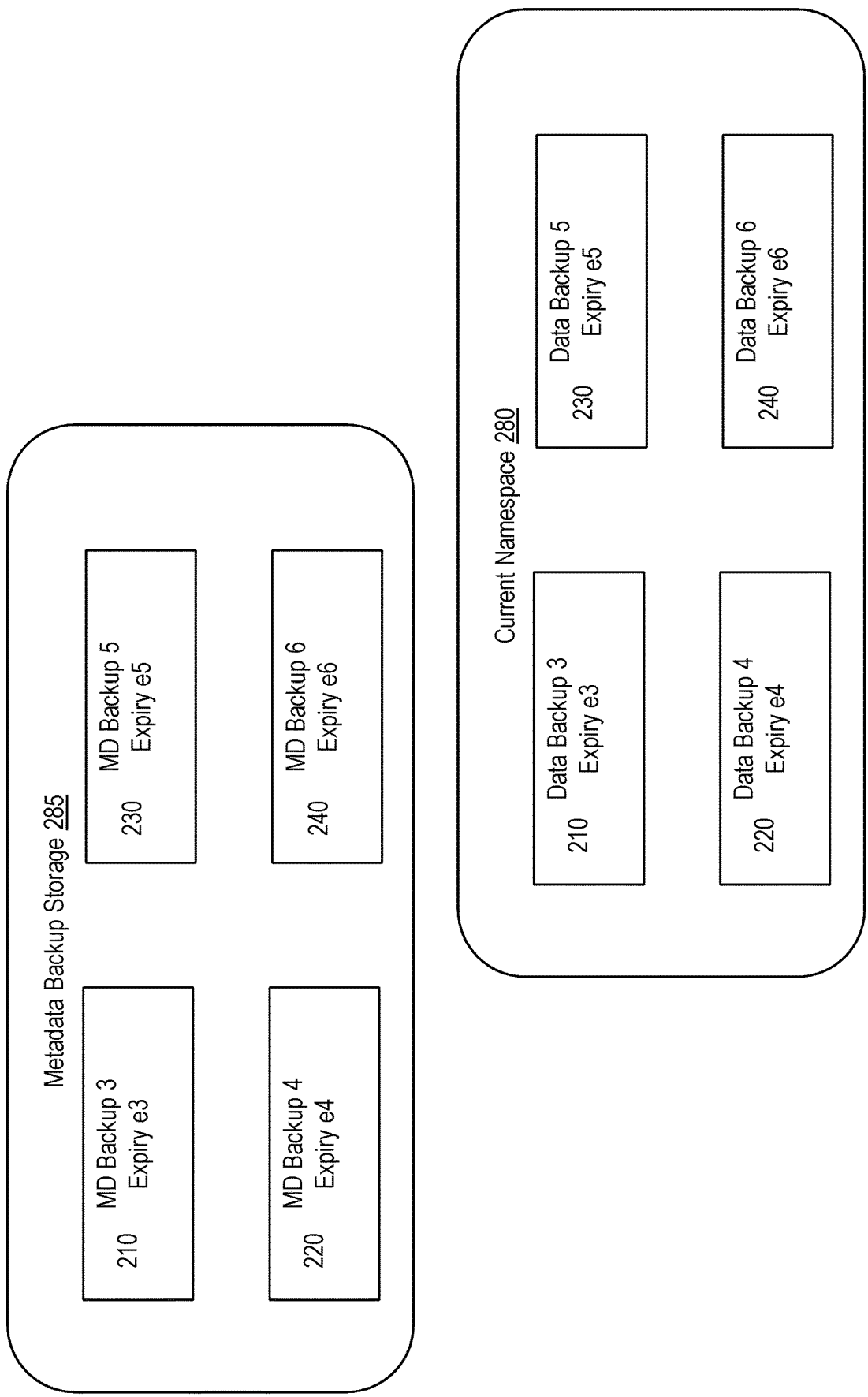
Figure 2D:
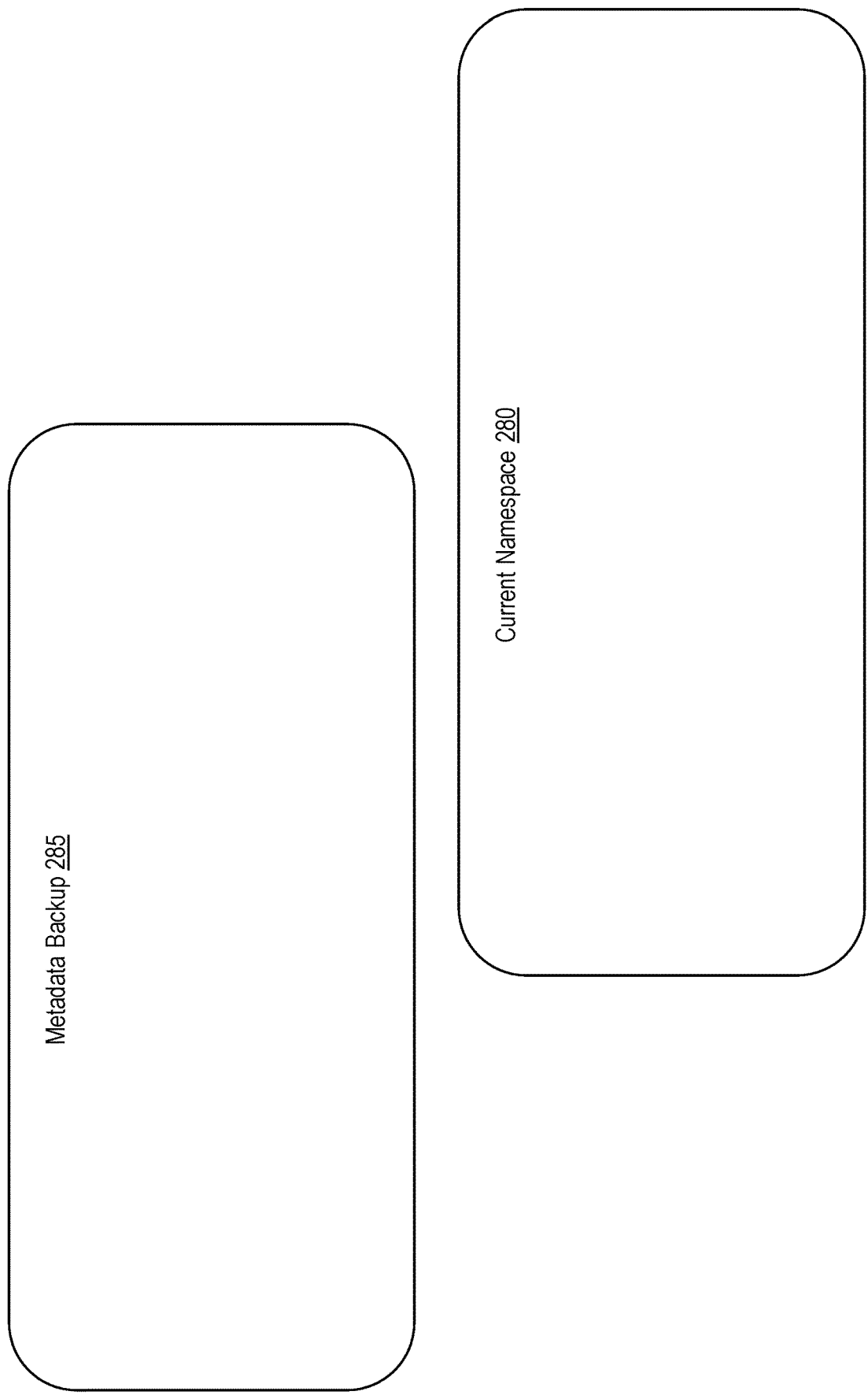

During the rollback recovery process, the metadata backup server 110 deletes the metadata backups that are stored in the metadata backup storage 285 at the time between t6 and t7, which are those shown in FIG. 2C so that the metadata backup storage 285 can revert back to the last know good copy of the metadata. In addition, the metadata backup server 110 directs the backup storage server 130 to delete the data backups that are in the current namespace 280, which are those shown in FIG. 2C. FIG. 2D shows the state of when the metadata backup storage 285 and the current namespace 280 have had their backups deleted.

The metadata backup server 110 is then able to revert back to the state of the snapshot 270 and MD backup B1 210, MD backup B2 220, MD backup B3 230, and MD backup B4 240 are restored to the metadata backup storage 285. In the backup storage server 130, a copy operation is performed that restores data backup B1 210, data backup B2 220, data backup B3 230, and data backup B4 240 of the snapshot 270 to the current namespace 280. In one embodiment, the backup storage server 130 includes a fastcopy engine 136 that performs a fastcopy operation that restores a "virtual copy" that has pointers to the data backup B1 210, data backup B2 220, data backup B3 230, and data backup B4 240 in the snapshot 270 to the current namespace 280, thus removing the need to restore an actual copy of the data backups to the current namespace 280. The rollback recovery process is shown in FIG. 2E.

Figure 2E:
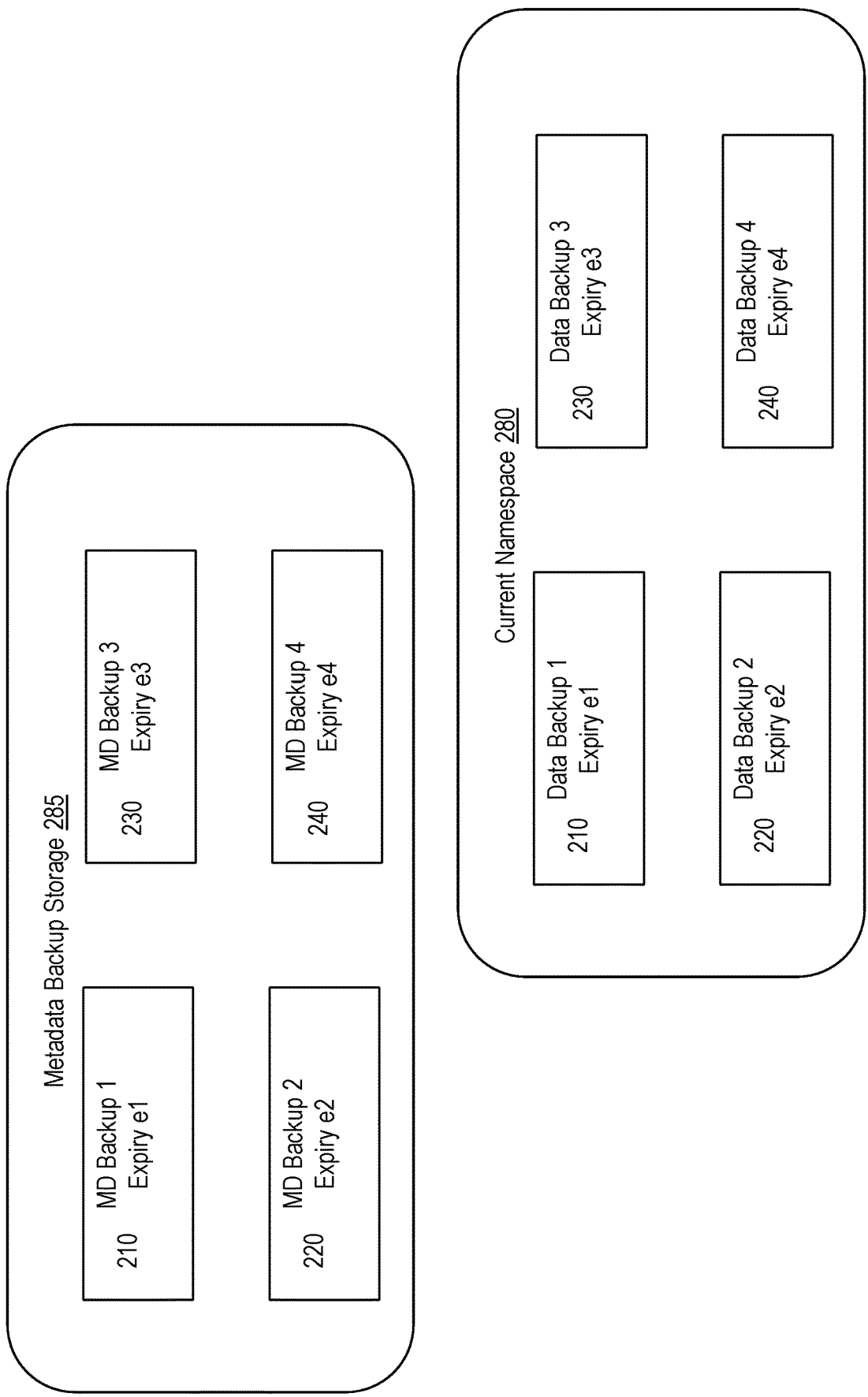

It will be noted that since the data backups of the current namespace 280 at the time between t6 and t7 shown in FIG. 2C were all removed during the rollback recovery process, the data backups B3 230 and B4 240 shown in the current namespace 280 shown in FIG. 2E after recovery are data backups that were recovered from the snapshot 270 and are not the data backups of the current namespace 280 at the time between t6 and t7 shown in FIG. 2C. Thus, even if there is an overlap of data backups in a snapshot and a current namespace, the data backups in the current namespace are still removed since in some embodiments it may be unknown if there have been any changes to the data backups B3 and B4 from the time the snapshot 270 was generated and the time of the current namespace 280 at the time between t6 and t7.

Figure 3A:
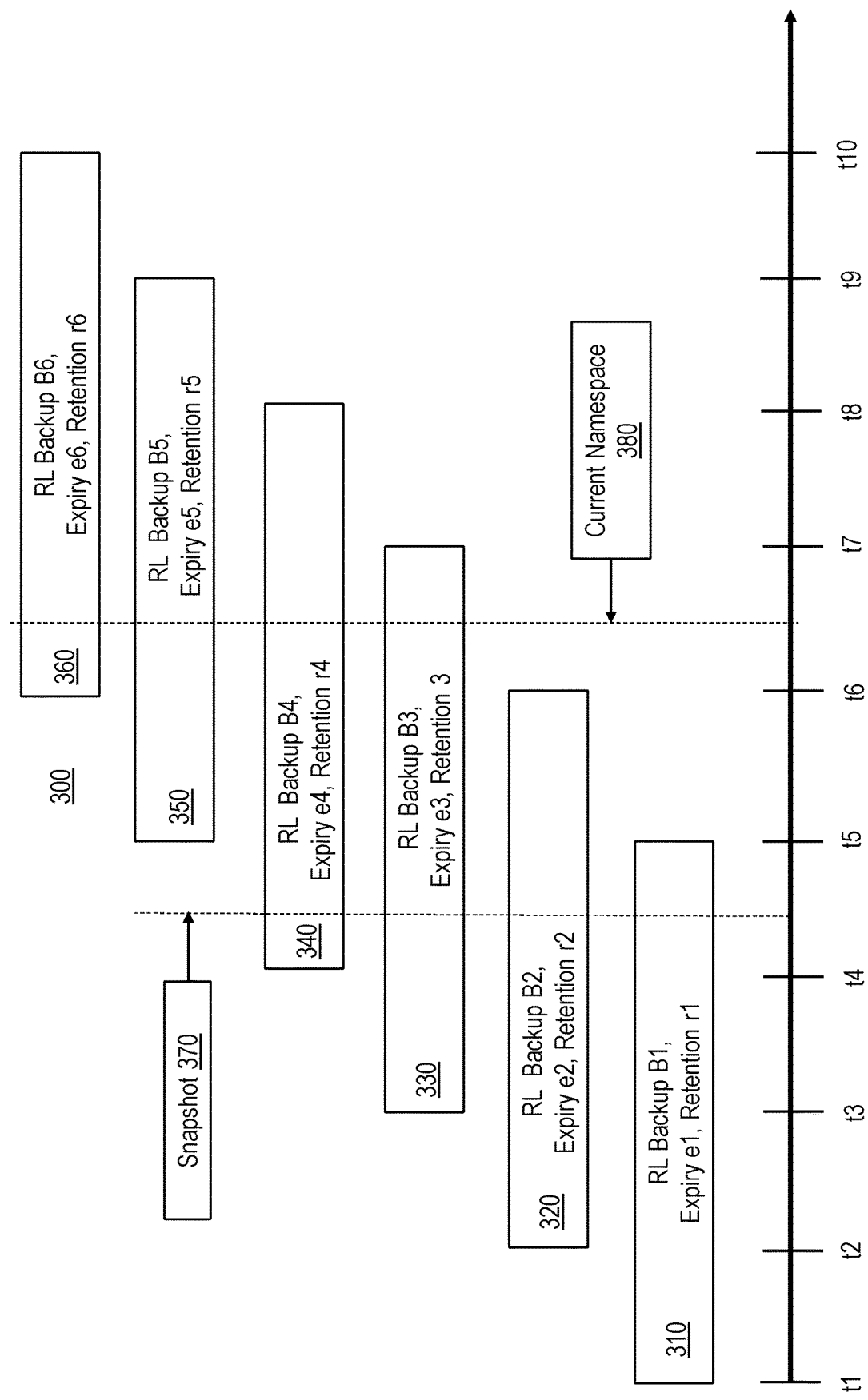

FIG. 3A illustrates an embodiment of a timeline of a rollback recovery process 300 that may also be performed by the backup and recovery computing system 100. A difference between the rollback recovery process 200 previously discussed and the rollback recovery process 300 is that in the rollback recovery process 300 the data backups in the backup storage server 130 are Retention Locked (RL). This means that for a specified retention time, a RL data backup cannot be removed from the backup storage server 130 or modified or altered in any way. Placing the backups in retention mode may be required for compliance with retention policies and the like for many users of the backup and recovery computing system 100. It will be noted, however, that the metadata backup server 110 does not typically support an RL mode and so the metadata backups are not retention locked.

As illustrated, the timeline of FIG. 3A shows time periods t1-t10 that are evenly spaced for ease of explanation. The timeline also shows the data backups of the backup storage server 130 as a RL backup B1 310 with an expiry time e1 and a retention time r1, a RL backup B2 320 with an expiry time e2 and a retention time r2, a RL backup B3 330 with an expiry time e3 and a retention time r3, a RL backup B4 340 with an expiry time e4 and a retention time r4, a RL backup B5 350 with an expiry time e5 and a retention time r5, and a backup B6 360 with an expiry time e6 and a retention time r6. It will be appreciated that for the metadata backups, the time line FIG. 3A would look the same as the time line of FIG. 2A. That is, the metadata backups would only include an expiry time and would not include the RL label as they are not retention locked.

To illustrate this example embodiment, for ease of explanation, it is assumed that e1<e2<e3<e4<e5<e6. In addition, it is assumed that r1<r2<r3<r4<r5<r6. Finally, it will be appreciated that for each RL backup, retention time<=expiry time. Please note, however, that the expiration times of the various backups do not need to be in this order. That is, although a lower number backup would be created before a higher number backup, the lower number backup need not expire first as it can have a longer expiry period. Thus, RL backup B1 310 would have to be created before RL backup B2 320, but would not have to expire before RL backup B2 320 expires. In addition, there is no requirement for the retention times to be in linear order as a lower number RL backup can have a retention time be longer than a higher number RL backup. Thus, for example, the RL backup B1 310 can have a retention time r1 of 15 days and the RL backup B2 320 can have a retention time r2 of 10 days.

As shown in the timeline of FIG. 3A, the RL backup B1 310 is created at time t1 and is expected to expire at time t5. The RL backup B2 320 is created at time t2 and is expected to expire at time t6. The RL backup B3 330 is completed at time t3 and is expected to expire time t7. The RL backup B4 340 is completed at time t4 and is expected to expire at time t8. The RL backup B5 350 is completed at time t5 and is expected to expire at time t9. The RL backup B6 360 is completed at time t6 and is expected to expire at time t10.

The metadata backup server 110 and the backup storage server 130 both generate a snapshot 370 at some time between t4 and t5. As shown in FIG. 3A, at the time when the snapshot 370 is generated only the backups B1-B4 are active as they have been created and stored on the backup storage server 130 and the metadata backup storage 142.

Figure 3B:
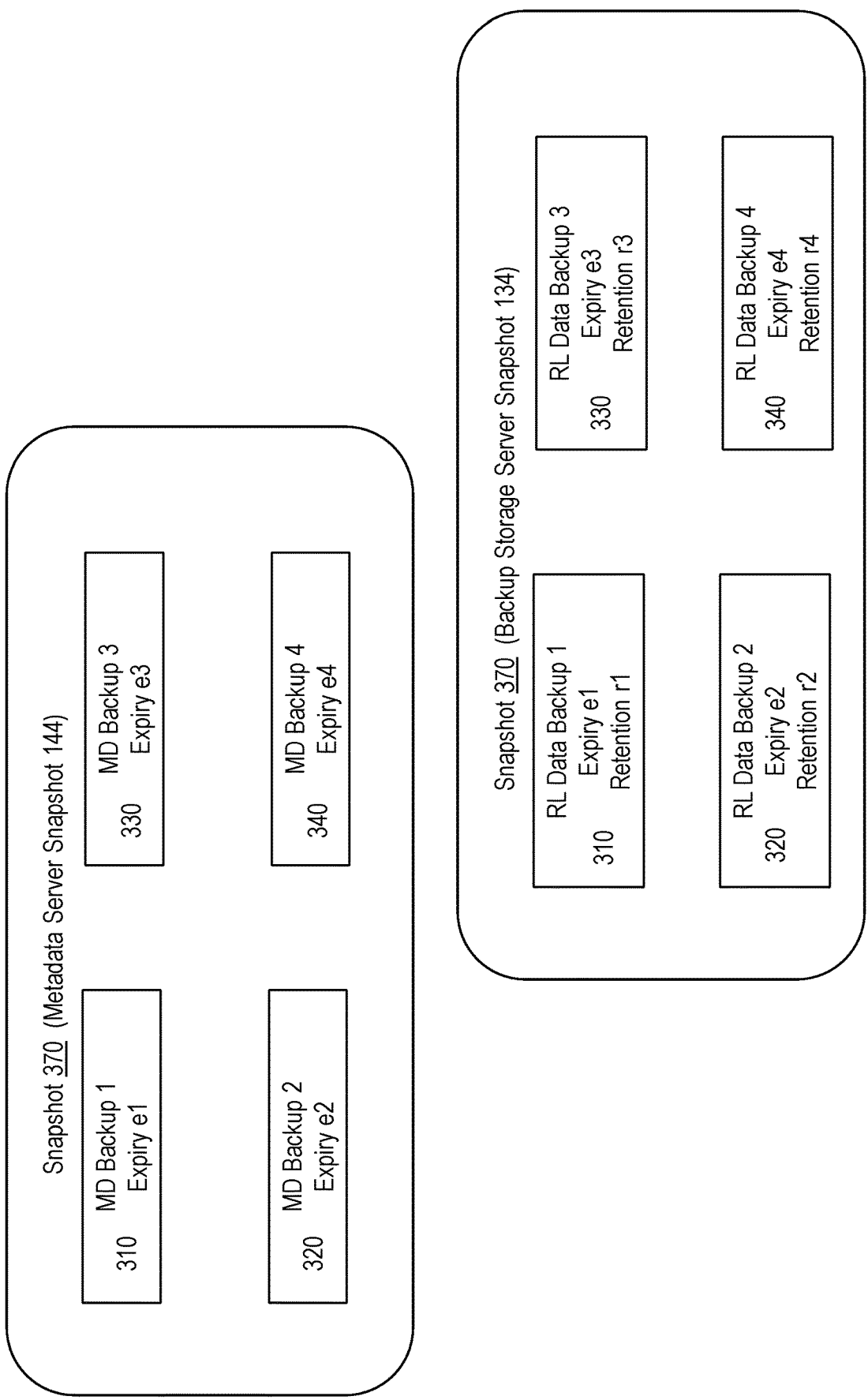

FIG. 3B illustrates the snapshot 370 generated by the metadata backup server 110 and the snapshot 370 generated the backup storage server 130. As shown in the figure, the snapshot 370 generated by the metadata backup server 110 includes MD backup B1 310, MD backup B2 320, MD backup B3 330, and MD backup B4 340, which may correspond to the metadata backups 172, 174, and 176, where "MD" is used to signify that these are metadata backups. As noted previously, the metadata backups are not retention locked and so are not labeled "RL".

The snapshot 370 generated by the backup storage server 130 includes data backup B1 310, data backup B2 320, data backup B3 330, and data backup B4 340, which may correspond to the data backups 162, 164, and 166, where "data" is used to signify that these are data backups. It will be appreciated that when the snapshot 370 is generated by the metadata backup server 110, the snapshot 370 is also generated by the backup storage server 130. Thus, the two snapshots work in tandem in the backup and recovery processes.

Figure 3C:
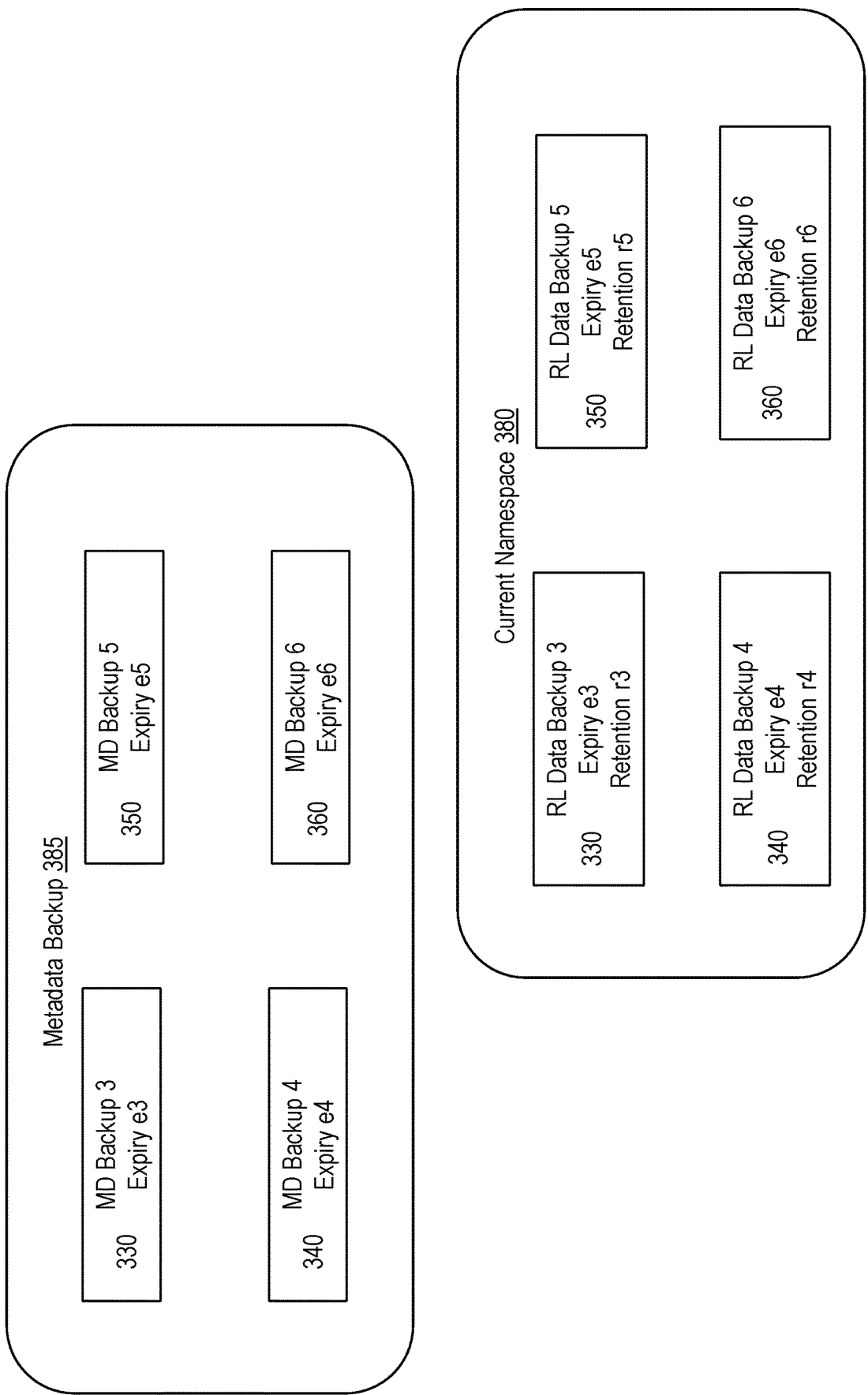

Referring again to the timeline of FIG. 3A, at time t5 the expiry time e1 has expired and at time t6 the expiry time e2 has expired. Accordingly, RL backup B1 310 is removed from the current namespace 132 and an MD backup corresponding to RL backup B1 310 is removed from the metadata backup storage 142 at time t5 and the RL backup B2 320 is removed from the current namespace 132 and an MD backup corresponding to RL backup B2 320 is removed from the metadata backup storage 142 at time t6. Thus, at a time between times t6 and t7, a current namespace 380, corresponding to the current namespace 132, includes RL data backup B3 330, RL data backup B4 340, RL data backup B5 350, and RL data backup B6 360 and a metadata backup storage 285, corresponding to the metadata backup storage 142, includes MD backup B3 330, MD backup B4 340, MD backup B5 350, and MD backup B6 360 as shown in FIG. 3C.

As in the embodiment of FIGS. 2A-2E, suppose in the embodiment of FIGS. 3A-3D that at the time between t6 and t7 the metadata has become corrupted, or the administrator needs to recover something from a snapshot. In such case, a rollback recovery process is performed. During the rollback recovery process, the metadata backup server 110 deletes the metadata backups that are stored in the metadata backup storage 285 at the time between t6 and t7, which are those shown in FIG. 2C so that the metadata backup storage 285 can revert back to the last know good copy of the metadata. In addition, the metadata backup server 110 directs the backup storage server 130 to delete the data backups that are in the current namespace 280, which are those shown in FIG. 2C.

However, as shown in FIG. 2D only the metadata backups in the metadata backup storage 285 are able to be deleted and then restored since they are not retention locked. The RL data backups in the current namespace 280, because they are retention locked, cannot be deleted and the rollback recovery process will fail, at least in respect to the backup storage server 130. That is, although the metadata backup server 110 is able to restore any corrupted metadata, the backup storage server 130 cannot restore any of the data backup from the snapshot 270. This is problematic for backup computing systems that rely on the rollback recovery process to recover both metadata backups and data backups as needed.

B. Aspects of Embodiments of the Current Invention

B1. Special Copy Operation

Accordingly, the principles of the present invention provide a novel method that overcomes the problems discussed previously. Advantageously, the novel method allows the backup and recovery computing system 100 to be able to perform the rollback recovery process when the data backups are retention locked. As part of the rollback recovery process, the novel method of the current invention compares a snapshot with the current namespace and determines which data backups are found in both the snapshot and the current namespace. A special fastcopy operation is then performed that restores only those data backups that are included in the snapshot, but are not included in the current namespace.

Figure 4A:
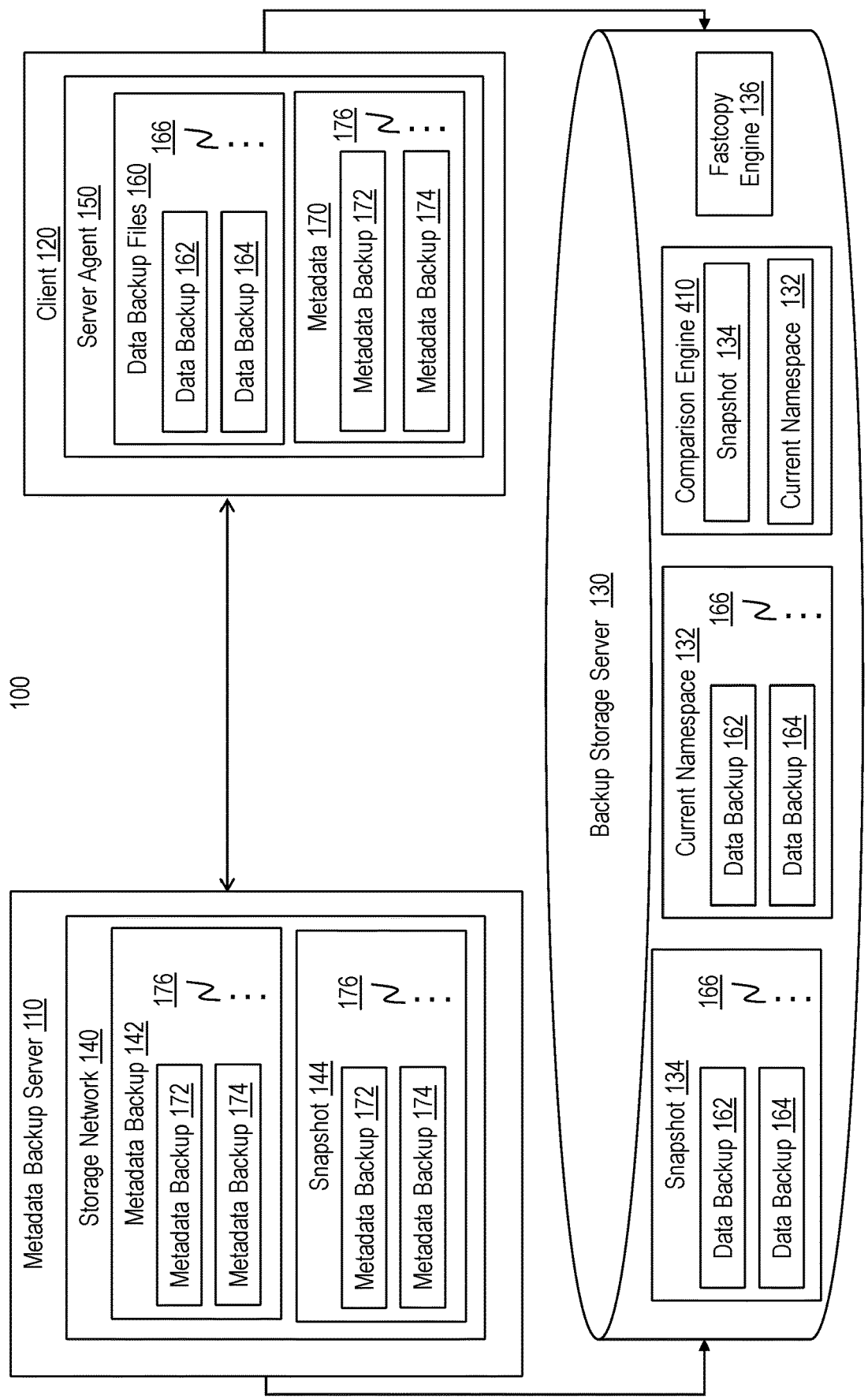
FIGS. 4A-4C illustrate an embodiment of a rollback recovery process using a special fastcopy operation.

FIG. 4A illustrates an embodiment of the backup and recovery computing system 100 that is configured to implement the novel method of the current invention. Accordingly, the backup and recovery computing system 100 of FIG. 4A includes some of the same elements as that of the embodiment of FIG. 1. Thus, elements previously discussed need not be discussed again.

As shown in the embodiment of FIG. 4A, the backup storage server includes a comparison engine 410. The comparison engine 410 reads the current namespace 132, which corresponds to the current namespace 380, and the snapshot 134 to determine which data backups are included in both of the current namespace 132 and the snapshot 134. A fastcopy operation is then performed which restores only those backups that are included in the snapshot, but are not included in the current namespace to the current namespace as will be explained with more detail to follow.

The novel method will now be explained with reference to the snapshot 370 and the current namespace 380 previously described since both of these were implemented in the retention lock scenario. Thus, the rollback recovery operation begins between time t6 and time t7 as in the embodiment of FIGS. 3A-3D. When the rollback recovery operation begins, as shown in FIG. 3D, the metadata backup server 110 deletes the metadata backups that are stored in the metadata backup storage 385 at the time between t6 and t7, which are those shown in FIG. 3C, so that the metadata backup storage 385 can revert back to the last known good copy of the metadata. In addition, because the data backups are retention locked on the backup storage server 130, the metadata backup server 110 no longer directs the backup storage server 130 to delete the data backups that are in the current namespace 380 as this would fail. Rather, the metadata backup server 110 directs the backup storage server 130 to implement the novel method as part of the rollback recovery process to restore those data backups that are no longer included in the current namespace 380. Accordingly, the backup storage server 130 will begin the novel method as part of the rollback recovery process by causing the comparison engine 410 to access the snapshot 370 and the current namespace 380 to determine differences between the snapshot 370 and the current namespace 380. In other words, a determination is made of what is included in the snapshot 370, but is not included in the current namespace 380. Thus, the comparison engine can determine those data backups included in the snapshot 370, but not included in the current namespace 380, and restore them to the current namespace 380.

In addition, the comparison engine 410 can determine any differences between the data backups included in the snapshot 370 and the current namespace 380. Thus, if there is a data backup included in both the snapshot 370 and current namespace 380 and this data backup has been any modified in the time between when the snapshot 370 was generated and the current namespace, the comparison engine 410 will determine this and restore the data backup to the state of the snapshot 370. It will be appreciated that this second function of the comparison engine would only apply to a data backup that was not retention locked as a retention locked data backup cannot typically be modified in the time between when the snapshot 370 was generated and the current namespace.

Figure 4B:
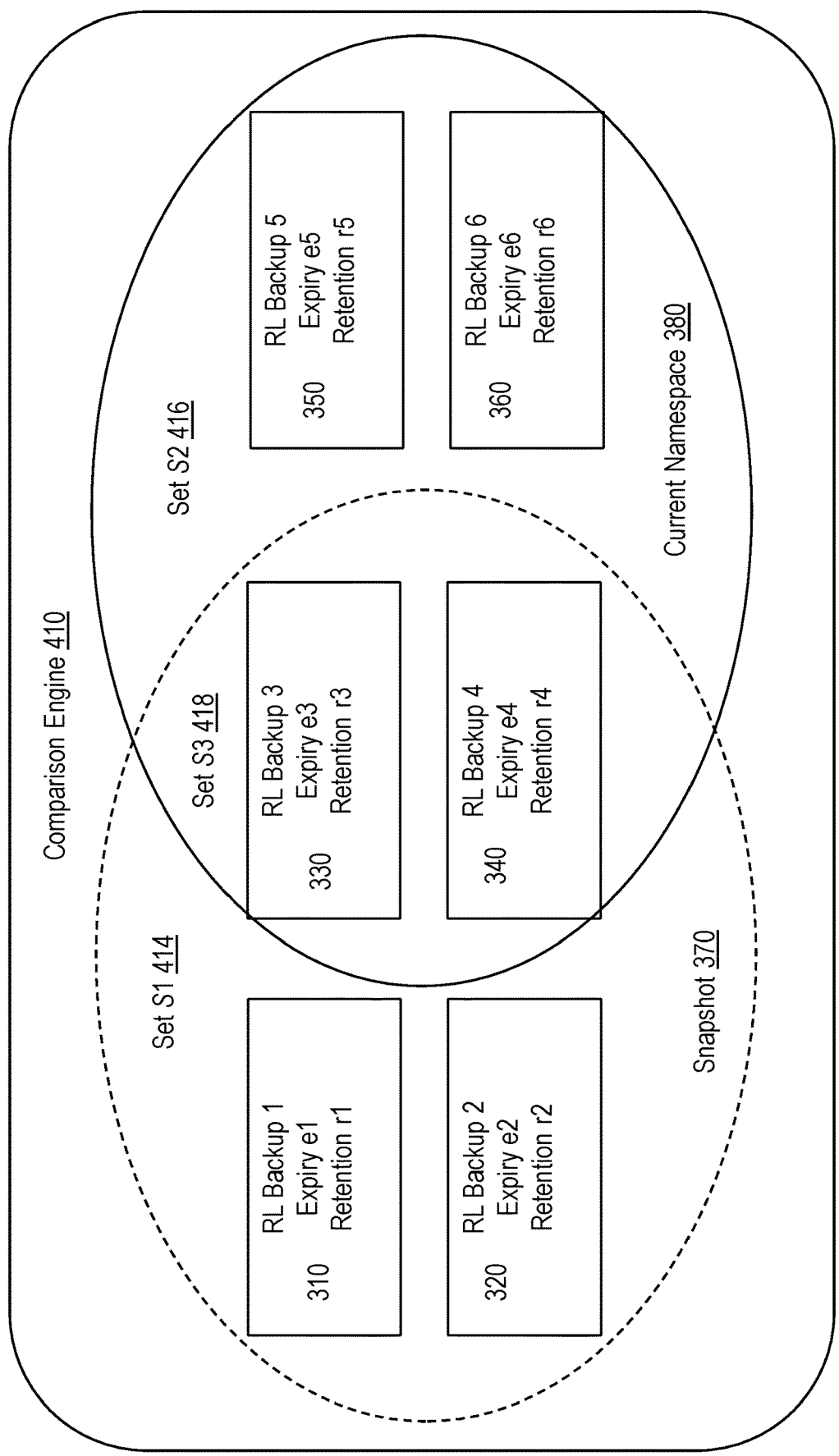

FIG. 4B illustrates an example embodiment of the comparison engine 410 and its operation. As illustrated in FIG. 4B, the comparison engine 410 accesses both the snapshot 370 and the current namespace 380. As discussed previously, the snapshot 370 includes RL backup B1 310, RL backup B2 320, RL backup B3 330, and RL backup B4 340. The current namespace 380 includes RL backup B3 330, RL backup B4 340, RL backup B5 350, and RL backup B6 360.

The comparison engine 410 considers the data backups of the snapshot 370 as a first set $S1$ 414 and considers the backups of the current namespace 380 as a second set $S2$ 416. The comparison engine then finds the intersection of $S1$ 414 and $S1$ 416 to find the common backups. Thus, the common backups between the snapshot 370 and the current namespace 380 are: $S1 \cap S2$, which is RL backup B3 330 and RL backup B4 340, which can be considered a third set $S3$ 418. Then, the list of data backups that are included in the snapshot 370, but are not included in the current namespace 380 can be determined as: $S1 - S3$, which are RL backup B1 310 and RL backup B2 320. Likewise, the list of backups that are included in the current namespace 380, but are not included in the snapshot 370 can be determined as: $S2 - S3$, which are RL backup B5 350 and RL backup B6 360. It will be appreciated that the example embodiment of the comparison engine 410 only performs its operation on a few backups for ease of explanation. However, in actual operation the comparison engine 410 would perform its operation on tens of millions of data backups and to the operation would not be as trivial as that disclosed herein.

Once the comparison engine 410 determines the set of data backups included in the snapshot 370, but that are not included in the current namespace 380, a special fastcopy operation is performed by the fastcopy engine 136 of the backup storage server 130. During the special fastcopy operation, those data backups included in the snapshot 370, but that are not included in the current namespace 380, are virtually copied to the current namespace 380. As discussed above, the fastcopy operation is considered a virtual copy because only pointers to the actual data included in the snapshot 370 are restored to the current namespace 380. The special fastcopy operation also ignores the set of backups included in both the snapshot 370 and the current namespace 380 because, even though they are included in the snapshot, they already exist in the current namespace.

Figure 4C:
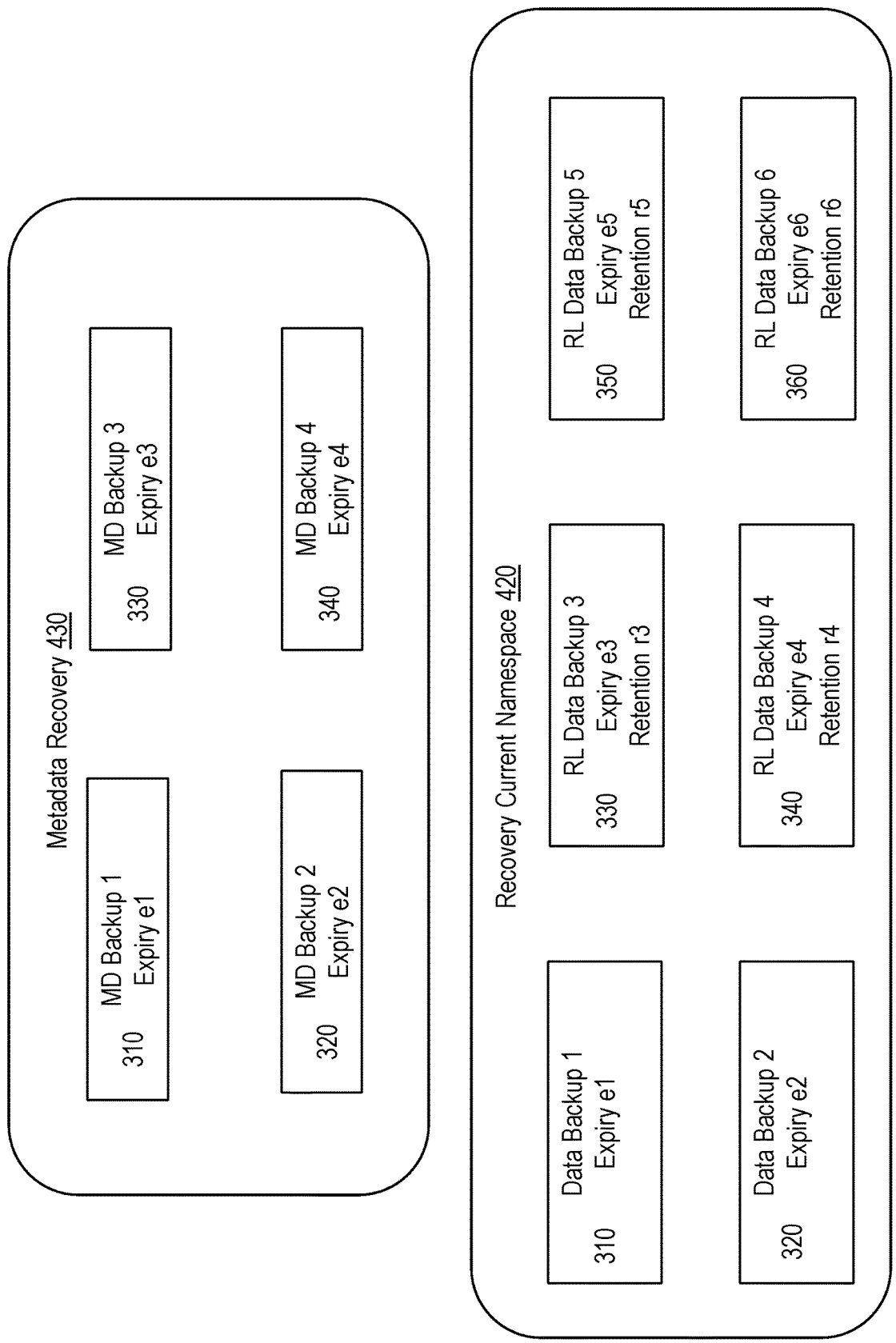

FIG. 4C illustrates an embodiment of the current namespace after the special copy operation has been performed. For ease of explanation, the namespace of FIG. 4C is labeled as recovery current namespace 420. However, it will be appreciated that the recovery current namespace 420 is actually the current namespace 380 with the addition of the set of backups included in the snapshot 370, but not included in the current namespace 380 prior to the rollback recovery procedure.

As illustrated in FIG. 4C, the recovery current namespace 420 includes RL data backup B3 330, RL data backup B4 340, RL data backup B5 350, and RL data backup B6 360. Since these data backups are retention locked, they cannot be removed until their retention time expires. The recovery current namespace 420 also includes data backup B1 310 and data backup B2 320, which have been fast copied from the snapshot 370 into the recovery current namespace 420 by the special fastcopy operation since they belonged to the set of data backups included in the snapshot 370, but not included in the current namespace 380. Thus, the data backup B1 310 and the data backup B2 320 are now available for the use of the administrator as needed.

It will be noted that data backup B1 310 and data backup B2 320 are not labeled as being in retention lock. As discussed previously, these data backups had expired before the start of the rollback recovery process and had been removed from the current namespace because they were expired. Thus, since any retention time cannot be longer than the expiry time of a data backup, the retention time of these data backups expired at the time the data backup expired. Since retention time is not typically reset when data backup B1 310 and data backup B2 320 are recovered, these data backups are recovered in a non-retention lock state.

It will also be noted that the RL data backup B3 330 and RL data backup B4 340 included in the recovery current namespace 420 were not fast copied from the snapshot 370, but are the data backups that were already part of the current namespace 380. Thus, the novel method of the present invention makes use of the fact that those data backups included in the snapshot 370 that are already in the current namespace need not be fast copied since this would result in a duplication of data already in the current namespace. Accordingly, computing resources only need be used to fast copy those backups that do not already exist in the current namespace, thus improving the speed and operation of the computing system 100.

In parallel with the recovery of data backup B1 310 and data backup B2 320 from the snapshot 370, the metadata backup server 110 also performs a rollback recovery process that restores the metadata in the metadata backup to the state that existed at the time of the snapshot 370. This is illustrated in FIG. 4C as metadata recovery 430 for ease of explanation, which corresponds to metadata recovery 385. Accordingly, the recovered metadata includes MD backup B1 310, MD backup B2 320, MD backup B3 330, and MD backup B4 340, but does not include MD backup B5 350, and MD backup B6 360 since these metadata backups were not included in snapshot 370. Thus, the metadata corresponding to the since RL data backup B5 350 and RL data backup B6 360 is deleted from the metadata backup server 110.

As previously mentioned, the recovery current namespace 420 also includes RL data backup B5 350 and RL data backup B6 360. These data backups are not included in the snapshot 370 and thus do not need to recovered by the rollback recovery procedure. However, since RL data backup B5 350 and RL data backup B6 360 are retention locked they cannot be removed from the recovery current namespace 420 and so they must stay in the recovery current namespace 420 until such time as their retention time expires or they expire. Advantageously, the novel method provides a way that RL data backup B5 350 and RL data backup B6 360can be "ignored" by the system. As mentioned previously, the metadata backup server 110 performs a rollback recovery process that restores the metadata recovery 430, which does not include any metadata for the RL data backup B5 350 and RL data backup B6 360. Thus, even though the RL data backup B5 350 and RL data backup B6 360 exist in the recovery current namespace 420, they are now unknown to the metadata backup server 110. Accordingly, once their retention time expires or they expire, RL data backup B5 350 and RL data backup B6 360will be removed them from the backup storage server 130.

In the scenario where metadata corruption was the reason for the rollback recovery process, there is nothing that has to be done on the backup storage server 130 side during the restoration of the metadata backups. That is, the metadata backup server 110 will restore the metadata backup 142 to the state shown in metadata recovery 430. Thus, there is no need to perform the rollback recovery process in the backup data server 130 as the metadata rollback recovery process in performed in the metadata backup server 110.

C. Example Methods

Figure 5:
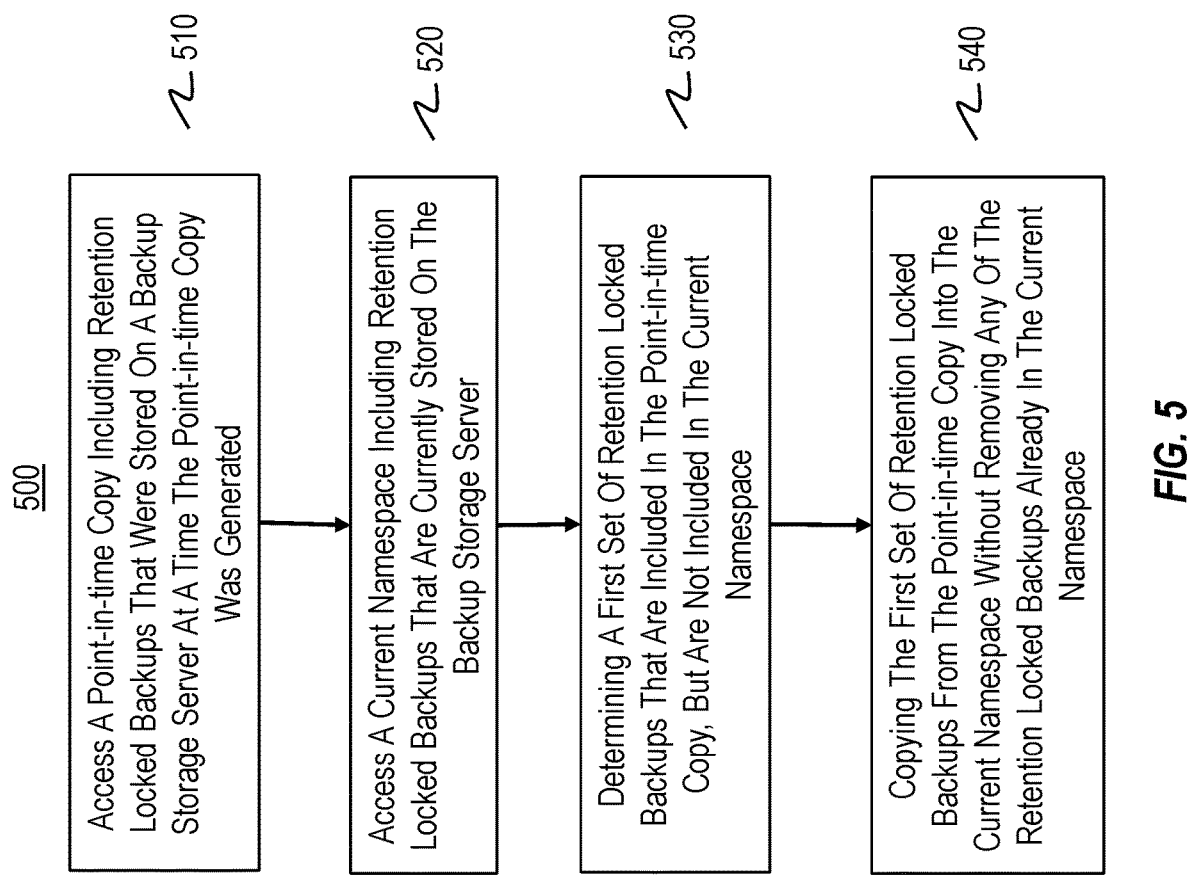
FIG. 5 illustrates a flowchart of an example method for performing a rollback recovery process with retention locked backups.

It is noted with respect to the disclosed methods, including the example method of FIG. 5, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, an example method 500 for performing a rollback recovery process with retention locked backups is disclosed. The method 500 will be described in relation to one or more of the figures previously described, although the method 500 is not limited to any particular embodiment.

The method 500 includes accessing a point-in-time copy including retention locked backups that were stored on a backup storage server at a time the point-in-time copy was generated (510). For example, as previously described snapshot 370 is accessed. The snapshot includes those backups that were stored on the backup server when the snapshot was generated. These include RL backup B1 310, RL backup B2 320, RL backup B3 330, and RL backup B4 340.

The method 500 includes accessing a current namespace including retention locked backups that are currently stored on the backup storage server, wherein each retention locked backup includes backup data (520). For example, as previously described the current namespace 380 is accessed. The current namespace 380 includes RL backup B3 330, RL backup B4 340, RL backup B5 350, and RL backup B6 360. As also previously described each retention locked backup includes the data backup files 160.

The method 500 includes determining a first set of retention locked backups that are included in the point-in-time copy, but are not included in the current namespace (530). For example, as previously described the comparison engine 410 determines that the RL backup B1 310 and RL backup B2 320 are included in the snapshot370, but are not included in the current namespace 380.

The method 500 includes copying the first set of retention locked backups from the point-in-time copy into the current namespace without removing any of the retention locked backups already in the current namespace (540). For example, as previously described the backup B1 310 and the backup B2 320 are copied from the snapshot 370 into the recovery current namespace 420. Unlike the process of FIGS. 2A-2D, the backups in the current namespace are not removed since they are retention locked.

D. Further Example Embodiments

Following are some further example embodiments of the invention. These are presented only by way of example and are not intended to limit the scope of the invention in any way.

Embodiment 1. A method, comprising: accessing a point-in-time copy including retention locked backups that were stored on a backup storage server at a time the point-in-time copy was generated; accessing a current namespace including retention locked backups that are currently stored on the backup storage server, wherein each retention locked backup includes backup data files; determining a first set of retention locked backups that are included in the point-in-time copy, but are not included in the current namespace; and copying the first set of retention locked backups from the point-in-time copy into the current namespace without removing any of the retention locked backups already in the current namespace Embodiment 2. The method of embodiment 1, further comprising: determining a second set of retention locked backups that are included in the point-in-time copy and also included in the current namespace, wherein the second set of retention locked backups is not copied from the point-in-time copy into the current namespace when the first set of retention locked backups is copied into the current namespace.

Embodiment 3. The method of embodiment 2, further comprising: determining a third set of retention locked backups that are not included in the point-in-time copy, but are included in the current namespace, wherein the third set of retention locked backups have corresponding metadata deleted at a metadata backup server when the first set of retention locked backups is copied into the current namespace.

Embodiment 4. The method of embodiment 3, wherein the third set of retention locked backups are removed from the backup storage server when a retention time of each one of the third set of retention locked backups that defines how long each one the third set of backups will be in retention lock expires.

Embodiment 5. The method of embodiments 1-4, wherein the first set of retention locked backups have expired since the time that the point-in-time copy was generated.

Embodiment 6. The method of embodiments 1-5, wherein the first set of retention locked backups do not have their retention time reset when they are copied from the point-in-time copy into the current namespace so as to no longer be retention locked.

Embodiment 7. The method of embodiments 1-6, wherein the retention locked backups include a retention time that defines a period of time that they are to be retention locked, wherein while they are retention locked they cannot be removed from the backup storage server.

Embodiment 8. The method of embodiments 1-7, wherein the retention locked backups include an expiry time that defines when each backup will expire.

Embodiment 9. The method of embodiments 1-8, wherein parallel to copying the first set of retention locked backups into the current namespace a metadata backup server performs a recovery of metadata backups that correspond to the first set of retention locked backups in the current namespace.

Embodiment 10. The method of embodiments 1-9, wherein each retention locked backup has a corresponding metadata backup stored on a metadata backup server.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

Finally, because the principles described herein may be performed in the context of a computing system some introductory discussion of a computing system will be described with respect to FIG. 6. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
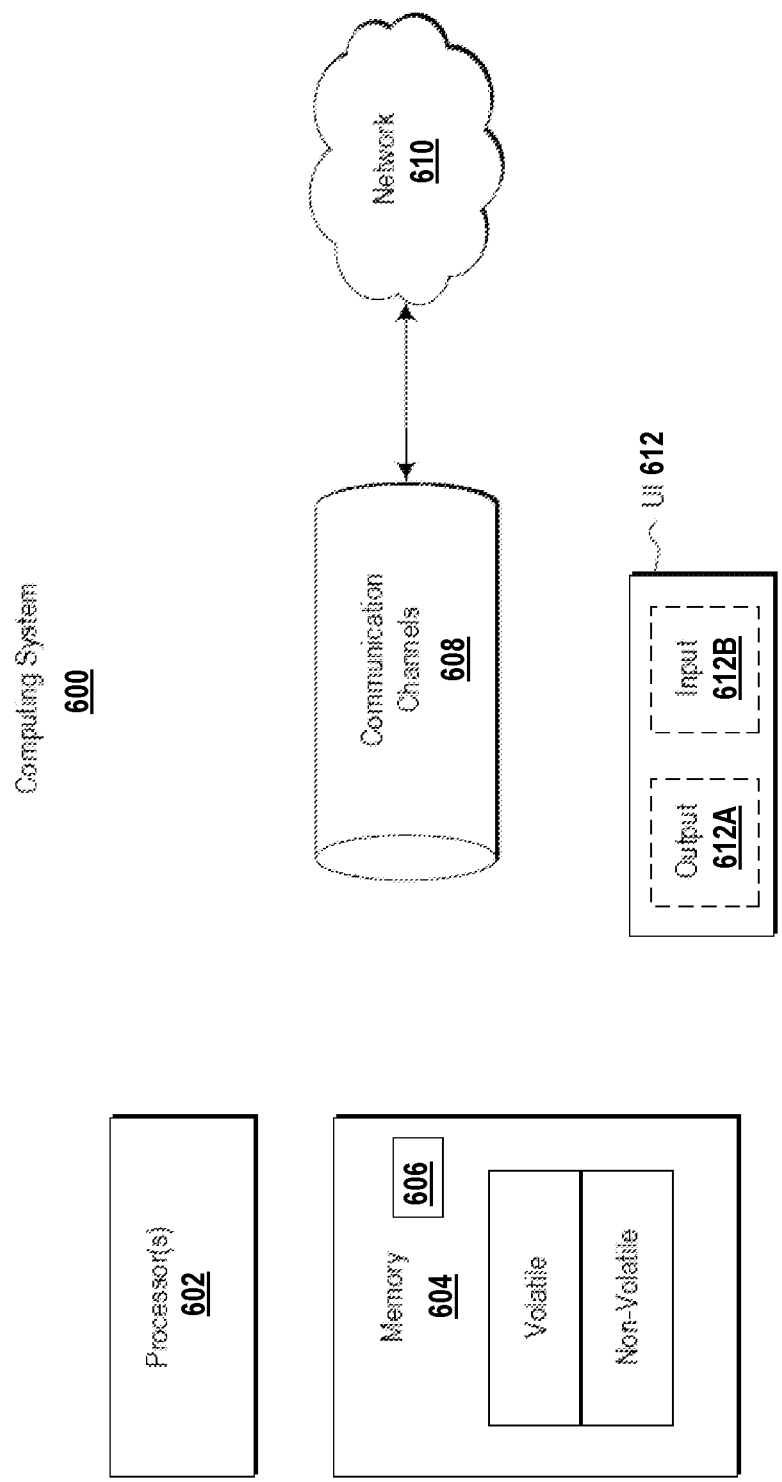
FIG. 6 illustrates an example computing system in which the embodiment described herein may be employed.

As illustrated in FIG. 6, in its most basic configuration, a computing system 600 typically includes at least one hardware processing unit 602 and memory 604. The processing unit 602 may include a general-purpose processor and may also include a field-programmable gate array (FPGA), an application-specific integrated circuit (ASIC), or any other specialized circuit. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 also has thereon multiple structures often referred to as an "executable component". For instance, memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, and so forth. Examples of input mechanisms 612B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 600 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 602 and memory 604, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    performing a rollback r CO process based on a point-in-time copy;
        accessing the point-in-time copy including retention locked backups that were stored on a backup storage server at a time the point-in-time copy was generated, wherein the retention locked backups are associated with a retention lock and an expiry time;
        accessing a current namespace including retention locked backups that are currently stored on the backup storage server, wherein each retention locked backup includes data backup files and is associated with a retention lock and an expiry time;
        determining a first set of retention locked backups that are included in the point-in-time copy, but are not included in the current namespace, wherein the retention locks and expiry times of the first set of retention locked backups have expired;
        determining a second set of retention locked backups that are included in the point-in-time copy and also included in the current namespace, wherein the second set of retention locked backups is not copied from the poi-in-time copy into the current namespace when the first set of retention locked backups is copied into the current namespace;
        determining a third set of retention locked backups that are not included in the point-in-time copy, but are included in the current namespace, wherein the third set of retention locked backups have corresponding metadata deleted at a metadata backup server when the first set of backups is copied into the current namespace; and
        copying the first set of retention locked backups from the point-in-time copy into the current namespace without removing the second and third set of retention locked backups in the current namespace, wherein the third set of retention locked backups included in the namespace and not included in the point in-time copy are ignored until their retention locks expire and then removed from the current namespace.

2. The method of claim 1, wherein the third set of retention locked backups are removed from the backup storage server when a retention time of each one of the third set of retention locked backups that defines how long each one the third set of retention locked backups will be in retention lock expires.

3. The method of claim 1, wherein the first set of retention locked backups have expired since the time that the point-in-time copy was generated.

4. The method of claim 1, wherein the first set of retention locked backups do not have their retention time reset when they are copied from the point-in-time copy into the current namespace so as to no longer be retention locked.

5. The method of claim 1, wherein the retention locked backups include a retention time that defines a period of time that they are to be retention locked, wherein while they are retention locked they cannot be removed from the backup storage server.

6. The method of claim 1, wherein the retention locked backups include an expiry time that defines when each backup will expire.

7. The method of claim 1, wherein parallel to copying the first set of retention locked backups into the current namespace a metadata backup server performs a recovery of metadata backups that correspond to the first set of retention locked backups in the current namespace.

8. The method of claim 1, wherein each retention locked backup has a corresponding metadata backup stored on a metadata backup server.

9. A non-transitory storage medium having stored therein instructions that are executable by one or more hardware processors to perform operations comprising:
    performing a rollback recovery process based on a point-in-copy;
        accessing the point-in-time copy including retention locked backups that were stored on a backup storage server at a time the point-in-time copy was generated, wherein the retention locked backups are associated with a retention lock and an expiry time;
        accessing a current namespace including retention locked backups that are currently stored on the backup storage server, wherein each retention locked backup includes data backup files and is associated with a retention lock and an expiry time;
        determining a first set of retention locked backups that are included in the point-in-time copy, but are not included in the current namespace, wherein the retention locks and expiry times of the first set of retention locked backups have expired;
        determining a second set of retention locked backups that are included in the point-in-time copy and also included in the current namespace, wherein the second set of retention locked backups is not copied from the point-in-time copy into the current namespace when the first set of retention locked backups is copied into the current namespace;
        determining a third set of retention locked backups that are not included in the point-in-time copy, but are included in the current namespace, wherein the third set of retention locked backups have corresponding metadata deleted at a metadata backup server when the first set of backups is copied into the current namespace; and copying the first set of retention locked backups from the point-in-time copy into the current namespace without removing the second and third set of retention locked backups in the current namespace, wherein the third set of retention locked backups included in the namespace and not included in the point-in-time copy are ignored until their retention locks expire and then removed from the current namespace.

10. The non-transitory storage medium of claim 9, wherein the third set of retention locked backups are removed from the backup storage server when a retention time of each one of the third set of retention locked backups that defines how long each one the third set of retention locked backups will be in retention lock expires.

11. The non-transitory storage medium of claim 9, wherein the first set of retention locked backups have expired since the time that the point-in-time copy was generated.

12. The non-transitory storage medium of claim 9, wherein the first set of retention locked backups do not have their retention time reset when they are copied from the point-in-time copy into the current namespace so as to no longer be retention locked.

13. The non-transitory storage medium of claim 9, wherein the retention locked backups include a retention time that defines a period of time that they are to be retention locked, wherein while they are retention locked they cannot be removed from the backup storage server.

14. The non-transitory storage medium of claim 9, wherein the retention locked backups include an expiry time that defines when each backup will expire.

15. The non-transitory storage medium of claim 9, wherein parallel to copying the first set of retention locked backups into the current namespace a metadata backup server performs a recovery of metadata backups that correspond to the first set of retention locked backups in the current namespace.

16. The non-transitory storage medium of claim 9, wherein each retention locked backup has a metadata backup stored on a metadata backup server.

\* \* \* \* \*